United States Patent [15] 3,662,258
Murphy et al. [45] May 9, 1972

[54] DEVICE FOR LOCATING NAILS BENEATH THE SURFACE OF A BOWLING LANE

[72] Inventors: Patrick J. Murphy; Robert C. Thompson, both of Muskegon, Mich.

[73] Assignee: Brunswick Corporation

[22] Filed: Sept. 16, 1969

[21] Appl. No.: 858,485

[52] U.S. Cl. ............................................................324/41
[51] Int. Cl. ......................................................G01r 33/00
[58] Field of Search .................324/41, 67, 3; 340/282, 258; 335/303, 306; 336/110

[56] References Cited

UNITED STATES PATENTS 2,179,240  11/1939  Breitenstein..............................324/41
3,065,412  11/1962  Rosenthal................................324/41
3,363,208  1/1968   Balet......................................324/41
2,856,580  10/1958  Clark......................................324/67

Primary Examiner—Rudolph V. Rolinec
Assistant Examiner—R. J. Corcoran
Attorney—Hofgren, Wegner, Allen, Stellman and McCord

[57] ABSTRACT

A nail locator for determining the location of nails close to the surface of a bowling lane including a base with a plurality of overlapping magnetic detectors mounted thereon with each of the detectors consisting of a permanent magnet and a coil potted in epoxy and arranged to induce a current in an input circuit upon relative movement of a sufficiently close nail, there being provided a plurality of detecting circuits each responsive to one of the magnetic detector input circuits and visual indicating lamps on a panel of the locator positioned to identify the approximate location of the nail.

1 Claim, 3 Drawing Figures

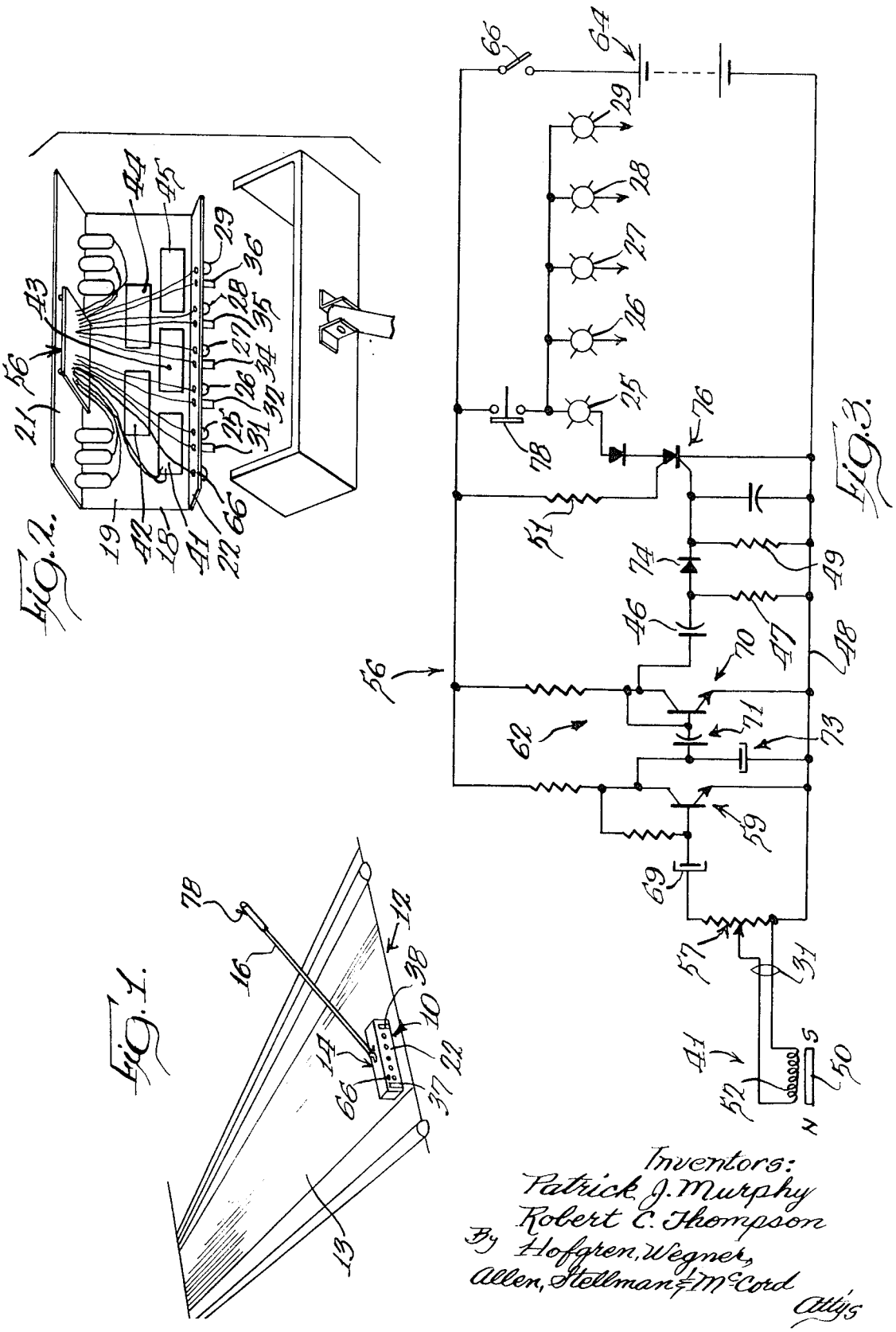

3,662,258

DEVICE FOR LOCATING NAILS BENEATH THE SURFACE OF A BOWLING LANE

BACKGROUND OF THE PRESENT INVENTION

During certain intervals of use of bowling lanes it is desirable to resurface the lanes with a lane resurfacer that includes a wood sanding or cutting tool. As is well known, bowling lanes are constructed of a plurality of narrow boards nailed on top of a base. Generally, the nails are embedded beneath the upper surface of the boards and generally extend in a diagonal relationship to the boards such as results when the boards are toenailed to the supporting base.

If any of these nails are close to the surface of the lane to be refinished, there is a possibility that the cutting tool or sander of the lane resurfacer will strike these nails resulting in damage both to the adjacent boards as well as the resurfacer.

To obviate this problem it is necessary that nails within a predetermined depth from the surface of the lane, e.g. one-quarter of an inch, be located and driven down beneath the one-quarter inch depth by a nail set. There have been provided in the past a plurality of different types of ferrous object proximity sensors which can be employed for this purpose. However, in order to accurately locate the nail it is necessary to employ a proximity sensor having a relatively small sensing head, since it would not be sufficient to locate a nail within a 1 foot area, for example. This is particularly true since the nails are generally not visible from above the surface of the lane. However, when a very small proximity sensor is employed alone to locate nails too close to the surface of the lane the task becomes an extremely tedious one requiring a great deal of time on the part of an operator.

It is, therefore, a primary object of the present invention to provide a nail locator that can quickly and accurately locate nails in bowling lanes that are too close to the surface of the lane for surface refinishing.

SUMMARY OF THE PRESENT INVENTION

In accordance with the present invention, a nail locating device is provided that includes a plurality of detecting circuits mounted within a base having a handle projecting therefrom so that the entire locator may be slid briskly along the surface of the bowling lane by the operator, covering, for example, a 12 inch width of the lane with each pass. Each of the detecting circuits includes a magnetic detector consisting of a permanent magnet and an adjacent coil potted in epoxy. When a nail passes in sufficient proximity to the permanent magnet it disturbs the magnetic field and the relative motion induces a current in the coil that provides an input to a detecting circuit that consists of a two-stage AC amplifier with an adjustable gain control. The gain control is provided by a potentiometer associated with each of the detectors and adjustable through knobs on a panel on the outside of the nail locator. The amplifier drives a bi-stable silicon controlled switch that when fired turns on an indicating lamp on the front panel of the nail locator so that it may be viewed by the operator.

Each of the indicating lamps is positioned in alignment with their respective magnetic detectors so that the operator can visually determine the approximate location of the nail by viewing which of the indicating lamps is lit.

Also provided in the indicator circuit is a reset switch for the purpose of turning off each of the indicating lamps which otherwise remain lit because of the bi-stable operation of the silicon controlled switch.

If desired, a smaller proximity sensor may be employed to pinpoint the exact location of the nail after the present nail locator indicates the approximate location, i.e., within 2 inches.

BRIEF DESCRIPTION OF THE DRAWINGS

FIG. 1 is a perspective view of a bowling lane with the present nail locator shown in working position;

FIG. 2 is a top perspective view of the present nail locator with the cover removed; and FIG. 3 is a schematic diagram of one of the detecting and indicating circuits according to the present invention.

DETAILED DESCRIPTION OF THE PREFERRED EMBODIMENT

Referring to the drawings and particularly to FIG. 1, a nail locator 10 is illustrated according to the present invention in its working position on the lane surface of a bowling lane 12. The lane 12 is conventionally constructed and includes a plurality of narrow boards 13, i.e., less than approximately 1 inch in width, that extend longitudinally with respect to the axis of the lane. During construction the boards 13 are conventionally glued and nailed to a supporting base. The nails are either toenailed into the sides of the boards 13 or driven down beneath the surface of the alley by a nail set to prevent them from obstructing or interfering in any way with the path of the bowling ball as it travels down the alley.

Frequently, these nails are so close to the surface of the boards 13 that even though they are beneath the surface, they would interfere with resurfacing tools conventionally employed in resurfacing bowling lanes of this type.

The nail locator 10 is provided for the purpose of locating nails that are sufficiently close to the surface of the boards 13 to interfere with the resurfacing operation. The locator 10 consists generally of a body 14 to which is pivotally secured a handle 16 which permits the operator to briskly walk up and down the alley 12 locating nails much more rapidly than with prior proximity sensors.

The body 12 consists of an aluminum base 18 having a bottom wall 19 and vertically projecting front and rear walls 21 and 22, respectively. The bottom surface of wall 19 is smooth and may be easily slid along the surface of alley 12. The wall 22 serves as a panel for locating indicating lamps 25, 26, 27, 28 and 29 as well as sensitivity control knobs 31, 33, 34, 35 and 36. The indicating lamps and the sensitivity control knobs are located on the side of the box 14 adjacent the operator so that they are both manually accessible and visually readable by the operator.

Also provided on the panel 22 on the side thereof visible to the operator are alignment stripes 37 and 38 as shown in FIG. 1 which indicate the width of scan to the operator.

Mounted on the bottom wall 19 of the base 18 are magnetic detectors 41, 42, 43, 44 and 45 which are generally flat and rectangular in configuration with detectors 42 and 44 overlapping the spaces between the detectors 41 and 43, and 43 and 45 respectively, to provide a complete scan between the indicating marks 37 and 38 on panel 22.

Each of the detectors 41, 42, 43, 44 and 45 consists of a rectangular flat permanent magnet 50 and a coil 52 adjacent and above the magnet both potted in epoxy. The magnetic detectors are constructed so that when passed over a nail sufficiently close under the surface of the alley, the nail will disturb the magnetic field of the magnet 50 reducing the reluctance of the magnetic circuit established thereby and inducing a current in coil 52. It is this induced current in coil 52 that through the detecting circuit shown in FIG. 3 causes the associated indicating light 31, 33, 34, 35 and 36 to light when the magnetic detector passes over a close nail. It should be understood that the indicating lights are aligned with the detector that energizes the light so that the operator can determine the approximate location of the nail by merely viewing which of the indicating lights is turned on.

Detecting circuits shown generally at 56 in FIG. 2 are mounted on the front wall 21 and the bottom wall 19. One of the detecting circuits 56 is illustrated in FIG. 3 and it should be understood that one is provided for each of the magnetic detectors 41, 42, 43, 44 and 45.

Referring to FIG. 3 wherein the detecting circuit 56 associated with magnetic detector 41 is illustrated, the coil 52 is seen to be coupled through a potentiometer 57 to a first stage 59 (transistor) of an AC audio amplifier 62. The potentiometer 57 is controlled by knob 31 on panel 22 and serves to vary the gain of the amplifier. In this manner the sensitivity of the detector 56 may be varied as desired in each channel and thus the nail detection depth may be varied as desired.

A DC bias for the amplifier 62 may be provided by a suitable DC source 64 such as an 8.4 volt radio battery. An "on-off" switch 66 controls the DC bias and may be mounted on rear panel 22 as shown in FIGS. 1 and 2. Capacitor 69 couples the signal from magnetic detector 41 to the first stage 59 of the amplifier and serves to also isolate the DC bias from the detecting coil 52. Second stage 70 of amplifier 62 is coupled to the first stage through capacitor 71. Capacitor 73 rolls off the frequency response to accentuate the nails. The output from the second stage 70 is coupled through diode 74 to a silicon controlled switch 76. The diode 74 allows positive going pulses to raise the gate of the silicon controlled switch 76 to its triggering level. The silicon controlled switch 76 is bi-stable and once it fires it will remain on, maintaining indicating lamp 25 energized.

Capacitor 46 couples the AC signals from the collector of transistor 70 to the input of the silicon controlled switch 76, while blocking off the DC quiescent voltage. A resistor 47 holds the junction of capacitor 46 and diode 74 at a reference above zero volt line 48. Without the resistor 47, the capacitor 46 would "pump up" and the AC signals would have a floating reference. Resistor 49 is the DC return for the cathode gate of silicon controlled switch 76.

For the purpose of feeding current to the anode gate of the silicon controlled switch 76, resistor 51 is coupled thereto and ensures dependable resetting of the silicon controlled switch 76.

For the purpose of resetting one or all of the lamps 25, 26, 27, 28 and 29 and the silicon controlled switches associated therewith, a reset switch 78 is provided in circuit with the indicating lamps. Switch 78 is located on the operating handle as shown in FIG. 1.

It is thus seen that the present nail locator, and more particularly the magnetic detectors 41, 42, 43, 44 and 45 utilize a variable reluctance principle similar to the pick-ups that sense guitar strings for electronic amplification. During use the potentiometers 57 are adjusted so that a brisk walking speed by the operator will cause a nail within a predetermined distance, e.g., ¼ inch of the lane surface, to induce a sufficient current in coil 52 to turn on the associated indicator lamp through the associated detecting circuit 56.

After a nail is located by the operator, as indicated by the energization of one or more of the lamps 25, 26, 27, 28 and 29, the operator may employ a small proximity sensor to pinpoint the nail location and then drive the nail down with a nail set.

We claim:

1. A detector for locating nails in a bowling lane upon relative movement of the detector over the lane surface, comprising: a base member having a lower surface slidable on the surface of the lane, a plurality of magnetic detectors on said base member for providing a signal upon relative movement between the magnetic detector and a sufficiently close nail, said magnetic detectors each including a flat permanent magnet and a coil mounted adjacent thereto, means potting the coil with respect to the magnet, said magnet and coil being positioned so that a proximal nail with sufficient relative movement will induce a current in said coil, detecting circuit means for each magnetic detector for detecting the induced current, indicating means responsive to each detecting circuit means, each detecting circuit means including an AC amplifier, a potentiometer coupling said coil to said amplifier for varying the sensitivity to the associated detector, a silicon control switch responsive to said amplifier, and a diode coupling said amplifier and said silicon control switch for gating positively going pulses to said switch.

* * * * *